(12) United States Patent
Cheng et al.

(10) Patent No.: US 6,487,292 B1
(45) Date of Patent: Nov. 26, 2002

(54) TELEPHONE TERMINAL CONNECTION COVER

(76) Inventors: Li-Der Cheng, 7F, No. 382, Hsin Feng Street, Keelung (TW); Yi-Rong Lee, 6F, No. 8, Lane 82, Sec. 7, Chung Shan N. Road, Taipei (TW)

( * ) Notice: Subject to any disclaimer, the term of this patent is extended or adjusted under 35 U.S.C. 154(b) by 0 days.

(21) Appl. No.: 09/568,612

(22) Filed: May 10, 2000

(51) Int. Cl.[7] ................................. H04M 1/00
(52) U.S. Cl. ................... 379/438; 379/413.04
(58) Field of Search ................ 379/451, 437, 379/438, 413.04; 361/519, 600, 824; 439/707, 713

(56) References Cited

U.S. PATENT DOCUMENTS 5,291,553 A * 3/1994 Smith .......................... 379/437
5,838,534 A * 11/1998 Yang ........................... 361/600

* cited by examiner

Primary Examiner—Jack Chiang

(57) ABSTRACT

A telephone connection cover has multiple holes defined in a top face of the cover; two caps each oppositely formed on a side of the cover; two notches each oppositely defined in a side of the cover, and each adjacent to one of the caps; multiple legs each extending from a corner of the cover for securing each corner of the terminal connection; and a fixing post extending from one side of the cover and into an aperture of the terminal connection. With such an arrangement, the terminal connection cover is able to prevent the terminal connection from being damaged by a falling object and becoming rusty due to the moisture in the air.

2 Claims, 2 Drawing Sheets

TELEPHONE TERMINAL CONNECTION COVER

BACKGROUND OF THE INVENTION

1. Field of the Invention

The present invention relates to a telephone terminal connection cover, and more particularly to a telephone terminal connection cover which is able to prevent falling object from damaging the terminal connection and is able to prevent the terminal connection from becoming rusty due to the moisture in the air.

2. Description of Related Art

Normally, a terminal connection of a public pay phone has no protection device to protect the terminal connection. In order to protect the terminal connection from being damaged by falling objects or becoming rusty because of the moisture in the air, a usual solution to this problem is to use an adhesive tape to cover the surface of the terminal connection. However, the adhesion of the adhesive tape usually will hinder the maintenance work because the screws on the terminal connection will be attached to each other.

Therefore, it is an objective of the invention to provide a terminal connection cover to mitigate and/or obviate the aforementioned problems.

SUMMARY OF THE INVENTION

The primary objective of the invention is to provide a terminal connection cover to protect the terminal connection of a telephone from being damaged by a falling object.

Furthermore, a still objective of the invention is that the cover is able to prevent the terminal connection of a telephone from becoming rusty because of the holes defined in the cover.

Other objects, advantages and novel features of the invention will become more apparent from the following detailed description when taken in conjunction with the accompanying drawings.

DETAILED DESCRIPTION OF PREFERRED EMBODIMENT

Figure 1:
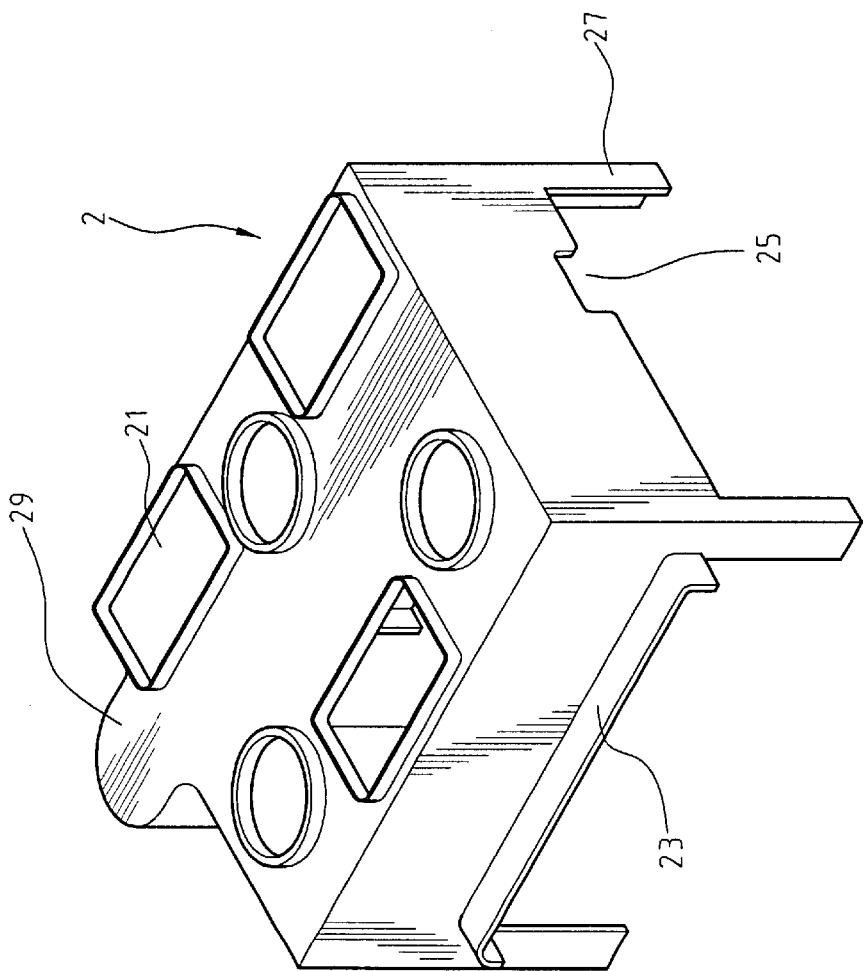
FIG. 1 is a perspective view of the terminal connection cover constructed in accordance with the present invention.

With reference to FIG. 1, it is to be noted that the terminal connection cover 2 has multiple holes 21 defined in a top face of the cover 2, two arcuate caps 23 each oppositely formed on a side of the cover 2, two notches 25 each oppositely defined in a side of the cover 2 and each adjacent to one of the caps 23, multiple legs 27 each extending from a corner of the cover 2 and a fixing post 29 extending from one side of the cover 2.

Figure 2:
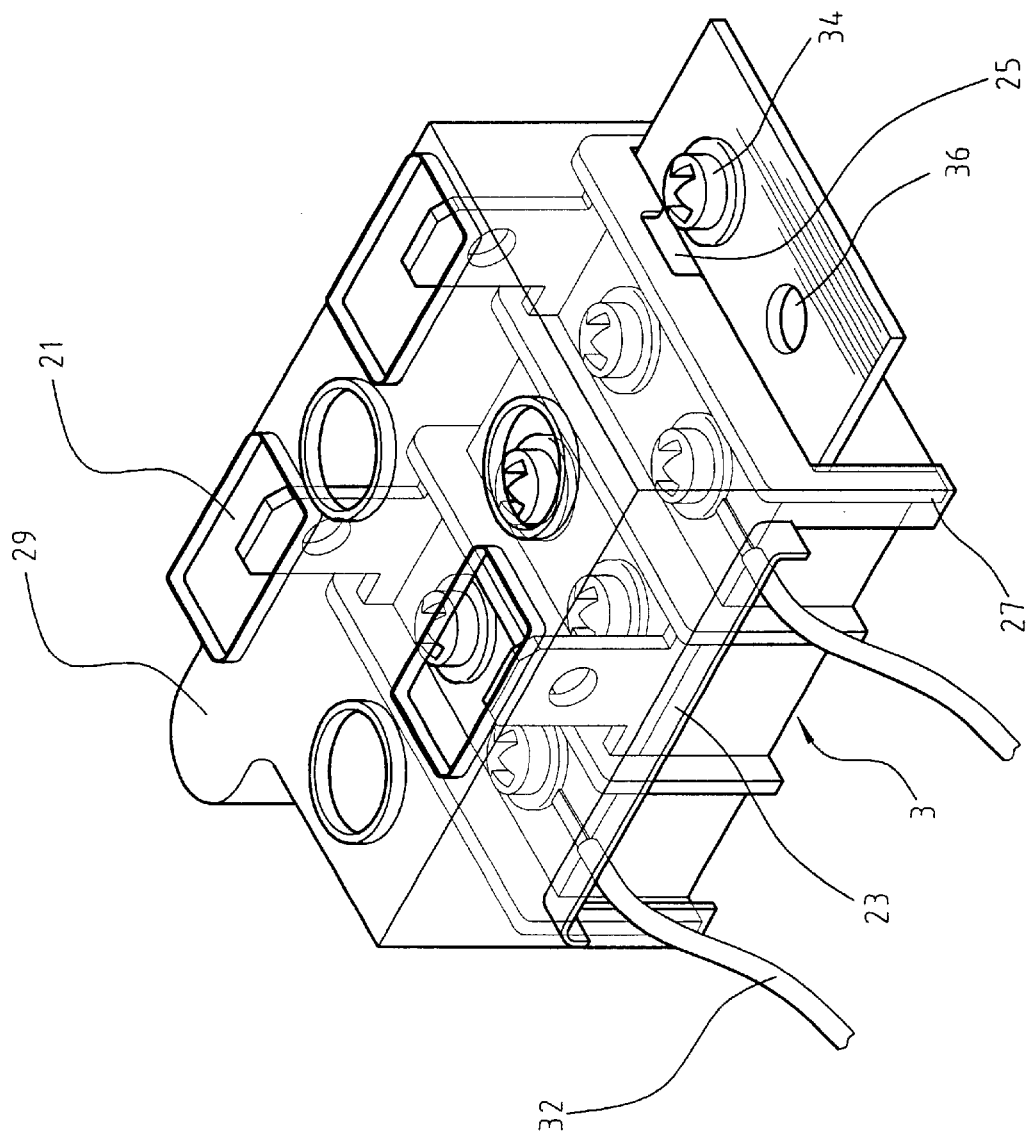
FIG. 2 is a perspective view of the terminal connection cover assembled with the terminal connection.

Referring to FIG. 2, when the cover 2 is assembled with the terminal connection 3, the multiple legs 27 extend onto a corner of the terminal connection 3 to secure the engagement therebetween and the fixing post 29 is inserted into an aperture 26 in the terminal connection 3, such that the relative location of the cover 2 and the terminal connection 3 is secured. After the cover 2 is mounted onto the terminal connection 3, the multiple holes 21 in the cover 2 are able to dissipate the moisture in the air so as to prevent the metal parts in the terminal connection from being rusty. The caps 23 each formed on opposite sides of the cover 2 are provided to prevent the rain from direct contact with the wire 32 and therefore causes a short. Furthermore, the notches 25 are defined so that after the assembly between the terminal connection 3 and the cover 2 is finished, the screws on the terminal connection 3 will not have the direct contact with cover 2.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A telephone terminal connection cover comprising:

multiple holes defined in a top face of the cover;

two caps each oppositely formed on a side of the cover;

two notches each oppositely defined in a side of the cover, and each adjacent to one of the caps;

multiple legs each extending from a corner of the cover for securing each corner of the terminal connection; and a fixing post extending from one side of the cover and into an aperture of the terminal connection.

2. The terminal connection cover as claimed in claim 1, wherein the caps are arcuate.

* * * * *